US007701878B2

(12) United States Patent  
Mora

(10) Patent No.: US 7,701,878 B2
(45) Date of Patent: Apr. 20, 2010

(54) COLLISION AVOIDANCE METHOD FOR HOME AUTOMATION DEVICES USING AN ETHERNET HUB

(75) Inventor: Oscar Mora, Caracas (VE)

(73) Assignee: Smart Matics International Corp., St. Michael (BB)

( * ) Notice: Subject to any disclaimer, the term of this patent is extended or adjusted under 35 U.S.C. 154(b) by 1164 days.

(21) Appl. No.: 10/906,694

(22) Filed: Mar. 2, 2005

(65) Prior Publication Data

US 2005/0135407 A1  Jun. 23, 2005

Related U.S. Application Data

(63) Continuation of application No. 09/682,062, filed on Jul. 16, 2001, now abandoned.

(51) Int. Cl.
*H04L 12/413* (2006.01)
(52) U.S. Cl. ........................ 370/255; 370/455; 370/461
(58) Field of Classification Search ......... 370/431–463, 370/255
See application file for complete search history.

(56) References Cited

U.S. PATENT DOCUMENTS

| 4,354,226 | A | | 10/1982 | Flickinger | |
|---|---|---|---|---|---|
| 5,319,641 | A | * | 6/1994 | Fridrich et al. | 370/447 |
| 5,784,375 | A | * | 7/1998 | Kalkunte et al. | 370/448 |
| 5,838,688 | A | * | 11/1998 | Kadambi et al. | 370/445 |
| 5,961,646 | A | * | 10/1999 | Sokol | 726/15 |
| 6,002,669 | A | | 12/1999 | White | |
| 6,055,578 | A | * | 4/2000 | Williams et al. | 709/253 |
| 6,473,403 | B1 | * | 10/2002 | Bare | 370/236 |
| 6,574,234 | B1 | | 6/2003 | Myer | |
| 6,577,600 | B1 | * | 6/2003 | Bare | 370/238 |
| 6,865,160 | B1 | * | 3/2005 | Bare | 370/256 |
| 7,340,252 | B2 | * | 3/2008 | Fingerhut et al. | 455/435.1 |
| 7,570,656 | B2 | * | 8/2009 | Raphaeli et al. | 370/445 |
| 2002/0057685 | A1 | * | 5/2002 | Ambe et al. | 370/386 |
| 2003/0179707 | A1 | * | 9/2003 | Bare | 370/235 |
| 2004/0171383 | A1 | * | 9/2004 | Fingerhut et al. | 455/435.1 |
| 2005/0135407 | A1 | * | 6/2005 | Mora | 370/445 |
| 2006/0258351 | A1 | * | 11/2006 | Fingerhut et al. | 455/435.1 |
| 2009/0322491 | A1 | * | 12/2009 | Wood, Jr. | 340/10.4 |

FOREIGN PATENT DOCUMENTS

WO   WO 03017701 A1 * 2/2003

* cited by examiner

*Primary Examiner*—Seema S Rao
*Assistant Examiner*—Henry Baron
(74) *Attorney, Agent, or Firm*—Furr Law Firm; Jeffrey M. Furr

(57) ABSTRACT

This invention pertains to a method for collision avoidance in local Ethernet networks, such as a home automation network, having a personal computer and a plurality of control devices attached. In such a network, when a management message is broadcast from the host personal computer to all connected control devices, each one of such devices must reply with a response to the host computer. There is, however, a probability that responses might collide, leading to data loss. The present invention discloses a method to generate delayed responses to the sender from each control device, where an individual device's delay is computed in accordance to a unique value contained in its MAC address. The method will guarantee different delay times for all attached control devices, and hence a collision-free operation.

4 Claims, 1 Drawing Sheet

COLLISION AVOIDANCE METHOD FOR HOME AUTOMATION DEVICES USING AN ETHERNET HUB

BACKGROUND

1. Field of Invention

This invention relates to collision avoidance in a communication layer two protocol, and more specifically, to a collision avoidance mechanism suitable to networking, low processing power devices, connected through an Ethernet hub.

2. Discussion of Prior Art

In modern systems it is very common to find a set of individual devices, each one with its own functions, capable of sharing information with each other through some kind of communication media. A clear example of such systems comes from a computer network. A local computer network is defined as a group of personal computers geographically located in a house or building. It is called Local Area Network (LAN) and comprises a group of personal computers sharing information, such as files, services, etc. The most cost-effective solution to such shared network is the utilization of only one physical media for all nodes present on the network. In this scheme, every device has the same right to use the unique channel to communicate with other device(s). A mechanism included in every device must be responsible for sharing the communication channel in an efficient manner.

The most popular type of computer network uses the Carrier Sense Multiple Access with Collision Detection (CSMA/CD) algorithm. A group of standards called 802, published by the IEEE, use this algorithm on different types of physical media.

The CSMA/CD algorithm senses first the communication media to determine if any other device is using it to transmit its information. If the channel is free, transmission starts but the channel is still sensed. If corrupt data is detected (sent information is different from actual channel content), transmission is aborted and each device involved in such collision backs off for a random time before sending the information again. Even when useful channel time is wasted on a collision, this mechanism has proved to satisfy the needs of a network that must be scalable to a great number of devices, in the order of hundreds of personal computers.

One of the most used CSMA/CD network is the 10BaseT Ethernet standard, which is very similar to the IEEE 802.3 standard. The Ethernet standard defines the type of physical media along with its electrical and timing characteristics. It works at 10 Mbps with Manchester bit encoding. It also defines the Media Access Control (MAC) with the CSMA/CD algorithm. When a device wants to transmit information to another device, the MAC layer of each device handles the recognition of the destination address in order to accept or refuse such packet. Such address is called MAC address, because it identifies the device accessing the communication channel. The MAC address is a 6-bytes unique identification number present on each device compatible with the Ethernet standard.

All devices connected to a 10BaseT Ethernet network use a twisted pair cable called UTP (Unshielded Twisted Pair) cable. A segment of UTP cable comes from each personal computer and is attached to a central device, which is responsible to connect all computers with each other. Initially, such device was called Ethernet hub. As said earlier, the hub takes any information coming from one of its connections and sends it to all other computers attached to it. It works as a repeater. Another device, called Ethernet switch, takes a step further and each connected computer is treated as an independent port, so information sent from one port to another doesn't have to be repeated to every other computer. It is directly sent from origin to destination port. Switches increase the performance, allowing a greater number of connected devices, but the cost is higher compared to a hub.

Due to its extended use, Ethernet LANs have not been limited to personal computers. Several devices used in industrial control and automation use this standard as the basis of communication network. It is also used in building and home automation, facilitating the merging of data computer networks and control networks. Having control devices attached to Ethernet networks makes it possible to perform remote configuration from a personal computer, reducing operational costs. It also allows the use of the personal computer as the monitoring station for the automation control network.

In order to make such control device interoperable with a personal computer, the communication protocol used by the computer must be present into the control device also. The most common protocol used by personal computers is the TCP/IP (Transfer Control Protocol/Internet Protocol). The IP protocol works at a lower level and is responsible for defining the logic address of each computer. That address is called the IP address, and each computer present on the same LAN must have different IP addresses. TCP protocol handles the integrity of the information and establishment of connections to transfer information between two devices present on the network in a reliable context. It is capable of fragmenting the information to make it more suitable for transmission over Ethernet networks. It also handles reordering of all pieces of incoming data and guarantees the correct arrival of all sent information. The TCP protocol is connection-oriented. A connection-oriented protocol has to ask for a connection to be opened. After the destination device accepts the connection petition, data transfer takes place, and finally the connection is closed by either of the two devices.

Another common protocol is the UDP/IP (User Datagram Protocol/Internet Protocol). Contrary to TCP, UDP protocol doesn't provide any reliability and it doesn't use any connection mechanism. It is called a message-oriented protocol, since each data packet goes from source to destination without any open-accept-transfer-close process.

As was stated before, the merging of a data network with a control network can be made only if both the personal computer and the control device handle the same communication protocol. In home automation specifically, low cost is one of the primary requirements for control devices. Such devices must be simple enough to keep cost down. That simplicity is achieved by using low processing power microcomputers, or most often, low processing power microcontrollers. This invention considers a low processing power microcontroller working at 8-bits, with 512 bytes (or less) of RAM registers and 8 k bytes (or less) of effective program memory. From this point and on the term microcontroller alone will be used as a reference to low processing power microcontrollers.

The TCP protocol is a very memory-demanding protocol, making difficult its implementation in a microcontroller. The UDP protocol instead requires much less memory resources, so its implementation in a microcontroller is easier.

Since home automation devices share the same Ethernet network with personal computers, they should behave as another connected computer in order to be recognized by them. The Dynamic Host Configuration Protocol (DHCP), defined on the public document RFC2131 and published by the Network Working Group, was created for a personal computer attached to a network to obtain automatically its IP address. Even when this protocol works with the UDP protocol, it requires sending and receiving UDP packets more than 100 bytes long. Some microcontrollers don't contain enough RAM registers to cover this requirement.

With such limitations, control devices can't be considered as personal computers also, even when they are attached to the same LAN.

Thus, there is the need for a specialized and simple mechanism with low memory and protocol requirements (UDP protocol, with data packets from 16 up to 64 bytes long), capable of handling network management functions, as IP address assignment, presence detection or any other function involving all connected control devices.

In accordance to these characteristics, a control network manager installed on a computer could use UDP broadcasting messaging to communicate with every control device. If a given broadcast message generates a response from each control device, a problem arises since all of them would try to respond at the same time. As was stated before, the Ethernet standard considers a back-off algorithm to handle network collisions, but in case of having 32 (which could be real numbers for a home automation systems) control devices, collisions would still occur on every retry, and the back-off algorithm would fail.

This multiple collision condition only occurs when Ethernet hubs are used, because they work as repeaters. Ethernet switches can handle such situation avoiding multiple collisions.

However, home automation is very likely to see hubs instead of switches, since their cost is considerably lower and the number of devices attached would rarely be more than 32 or 64. This invention to provides a simple mechanism to avoid multiple collisions occurring in an Ethernet network using hubs, in accordance to home automation control devices with limited processing power.

SUMMARY OF INVENTION

This invention discloses a method for collision avoidance in Ethernet networks, such as home automation networks, with both personal computers and control devices attached to it. Ethernet hubs are considered as the type of device used to create the Ethernet network.

When a network management message is sent as a broadcast information from one personal computer to all control devices, they will generate a delayed response to the sender computer. Such delay is generated on each control device in accordance to its own MAC address. It will guarantee different delay times on all attached control devices.

The minimal time interval between two consecutive MAC addresses and the maximum possible delay time are estimated from the maximum number of expected devices attached to the hub(s).

OBJECTS AND ADVANTAGES

Accordingly, several objects and advantages of the present invention are:
a) To provide a simple mechanism of collision avoidance for low processing power control devices attached to a hub-based Ethernet network;
b) To provide a delayed responding mechanism present on every control device, which guarantees unique, different delay values for each device;
c) To provide optimal delay time estimation for minimal timing spacing and maximum response time in accordance to the maximum of expected control devices;

Other objects and advantages of this invention will become apparent from a consideration of the ensuing description and drawings.

LIST OF REFERENCE NUMERALS IN DRAWINGS

Figure 1:
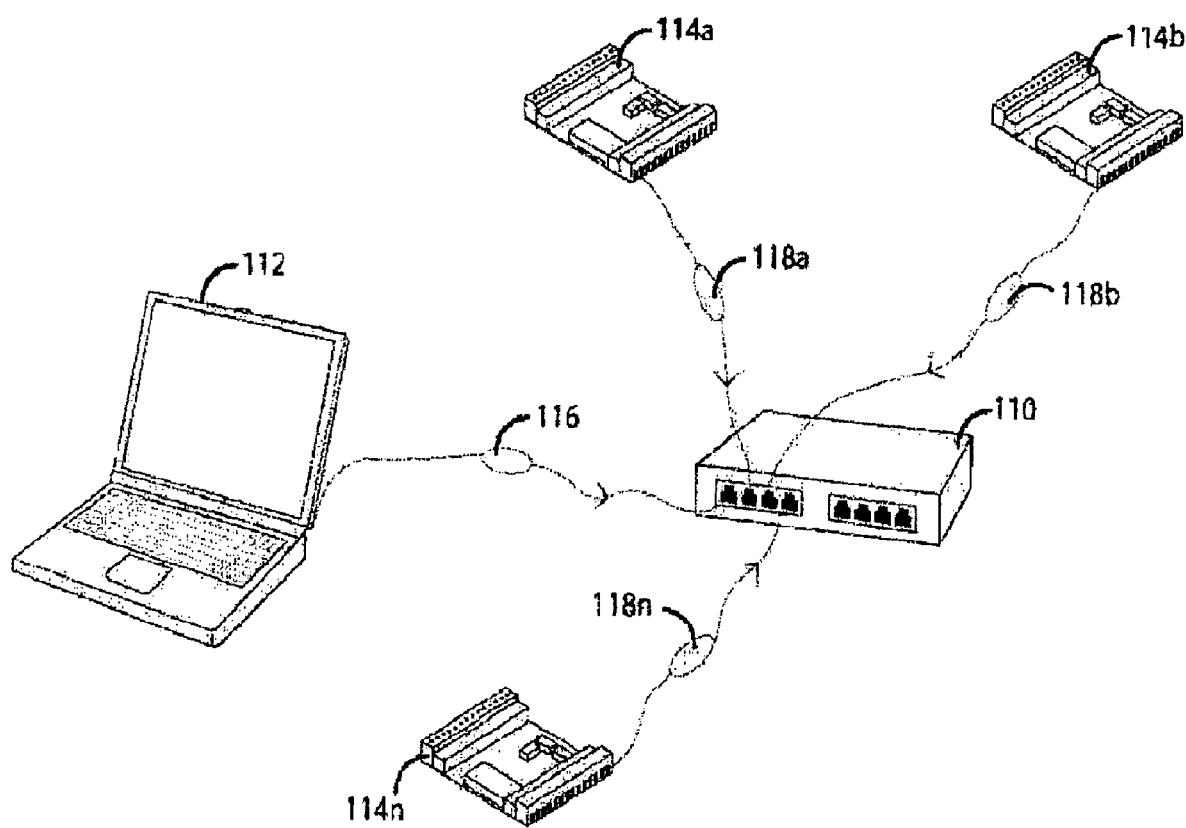
FIG. 1 Ethernet network connecting a personal computer and control devices.

110 Ethernet hub
112 Personal computer and network manager
114*a*, 114*b*, 114*n* Control devices for home automation
116 Broadcast message for network management
118*a*, 118*b*, 118*n* Response messages from control devices

DETAILED DESCRIPTION

Let there be an Ethernet installed in a residential infrastructure or a small building. Hubs are used to connect all Ethernet-compliant devices. The Ethernet network is used at the same time as a data network for personal computers and as a control network for home automation devices.

Control devices are considered as low cost, low processing power equipment, capable of handling the 10BaseT Ethernet standard for UTP cable, along with the connectionless UDP/IP protocol to communicate with both personal computers and other control devices.

A computer attached to the network executes all control network management functions applicable to all control devices. Management functions can be sent either as a point-to-point UDP message or as a broadcast UDP message. Broadcast messaging will be the point of discussion for this invention.

Given a set of broadcast messages sent by a computer and a group of control devices capable of receiving and decoding such messages. All control devices finally generate back a response to the origin computer. Due to the use of Ethernet hub(s), multiple initial collisions of response messages are avoided by including unique, deterministic delays generated in each control device. FIG. 1 represents an Ethernet network comprising a hub 110 connecting a personal computer 112 with control devices 114*a*, 114*b* and 114*n*. The suffix n is an indication that a generic number of control devices can be connected on the hub.

A hypothetical broadcast UDP/IP message 116, called Look-for-nodes is sent by the computer. As its name suggests, this network management message is sent to detect the presence of any control device. The corresponding response must include, for example, the actual IP address. All control devices 114*a*, 114*b* and 114*n* receive the UDP/IP message and must send back their response.

As was said before, every Ethernet-compliant device contains a 6-byte unique identification number called MAC address. The MAC can be separated in two parts: The three least significant bytes are called Organizationally Unique Identifier (OUI) and they identify the manufacturer of the device; the upper three bytes are used by the manufacturer to produce any kinds of 802-compliant devices. In the preferred embodiment of the invention, each control device must use the fourth byte (least significant byte of manufacturer's set of numbers) of its own MAC address to start a decreasing counter called TOUT_CTR. When the TOUT_CTR reaches zero, the response is sent to the origin computer. For a 10BaseT network, and considering up to 256 nodes, each count for de TOUT_CTR must last between 600 microseconds and 1 millisecond. It keeps an adequate minimum time spacing between consecutive MAC addresses (on the LSByte only) and also maintain a low maximum-worst case delay (256 milliseconds for the 1 millisecond spacing). Using one byte as the initial counter value allows 256 different delays, allowing a maximum of 256 control devices sharing the same Ethernet network. This number is enough for home automation solutions. Even more, Ethernet networks connected through hubs usually don't have more than 64 nodes connected to it.

In our example, if the least significant byte of the MAC address in control device 114a is lower than 114b's, and this last lower than 114n's, a response 118a will come first, followed by a response 118b, and this one followed by a response 118n. In another embodiment, not only the fourth byte of the MAC address is used, but up to all three upper bytes could be considered for a bigger TOUT_CTR. The preferred embodiment considers just one byte to keep a low resource-demanding profile. As was said before, using one byte would allow 256 different delays, so the chances to have two control devices with the same TOUT_CTR (equal fourth byte in the MAC address) are higher than having a TOUT_CTR represented by two or three bytes. It must be noticed that all three bytes would be an extreme case (there would exist more than 16 million of different TOUT_COUNTERS), because the worst wait case would be then in the order dozens of minutes! Using up to two bytes allows a maximum of 65536 different counts (chances of equal TOUT_CTR are almost zero), with a bearable one-minute delay for the worst wait case.

In a preferred embodiment of the invention, each broadcast message sent from computer 112 contains an adjustment parameter called CTR_ADJ. The CTR_ADJ can vary from 0 up to 255 and contains an exact or approximate number of actual nodes connected to the network. This information is considered to create a more or less accurate decreasing count to the TOUT_CTR. For Example, if the CTR_ADJ has a value of 10, then the full eight bit counter in TOUT_CTR is not necessary, and the four least significant bits are enough (four bits would allow 16 control nodes). This mechanism would increase the total response time. This procedure can be used as long as the control devices contain consecutive MAC addresses adjusted to the binary value contained in CTR_ADJ. If that is not the case, another simpler embodiment ignores the CTR_ADJ parameter and the full 8-bit counter TOUT_CTR is always used, regardless of the number of estimated nodes.

CONCLUSION, RAMIFICATIONS AND SCOPE OF INVENTION

As the reader can see, the collision avoidance mechanism shown here represents a simple solution for low processing power control devices, specific to in home automation systems.

Creating unique, delayed responses on each control device in response to a broadcast network management message, the occurrence of initial multiple collisions in an Ethernet hub is avoided. Since the unique MAC address contained on each Ethernet-compliant device is used as the initial timeout count, each delay will be different in a block of 256 devices (sufficient for home automation systems). With this mechanism, simple network management functions can be created to handle low cost control devices attached to an Ethernet network. A low computation time and low memory resource demanding protocol, like the UDP/IP protocol, along with short messages (16, 32 or 64 bytes long), will be enough to establish a communication between control devices and a personal computer.

While our above description contains many specificities, these should not be construed as limitations to the scope of the invention, but rather as an exemplification of one preferred embodiment thereof. Obviously, modifications and alterations will occur to others upon a reading and understanding of this specification such as, for example, creating a parameter that could control the time duration of each TOUT_CTR count.

The description above is intended, however, to include all such modifications and alterations insofar as they come within the scope of the appended claims or the equivalents thereof.

What is claimed is:

1. A method for collision avoidance in Ethernet networks, the method comprising the following steps:

having a network with a network management device and a plurality of control devices, using an Ethernet standard;

having each control device implement basic management functions executed by an embedded processor means;

having said network management device send a broadcast message to all of the control devices;

having each of said control devices send a response to said broadcast message depending on a unique time delay using the value in a unique byte of a control device's MAC address as an initial value of a counter;

decreasing counter until counter value reaches zero at which time said control device sends said response;

having said broadcast message contain an adjustment parameter, whenever applicable, to set an upper limit to the value of said counter.

2. A method as in claim 1 further comprising an Ethernet hub.

3. A method as in claim 1 including having each count last between 600 microseconds and 1 millisecond.

4. A method as in claim 1 including avoiding collisions of response messages by including unique, deterministic delays generated in each control device.

* * * * *